United States Patent
Ninan et al.

(10) Patent No.: US 9,468,075 B1
(45) Date of Patent: Oct. 11, 2016

(54) EMERGENCY LIGHTING SYSTEM WITH SMART SWITCHING

(71) Applicant: Wipro Limited, Bangalore (IN)

(72) Inventors: Thomas Chittakattu Ninan, Kannur (IN); Vijay Kumar, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 0 days.

(21) Appl. No.: 14/851,014

(22) Filed: Sep. 11, 2015

(30) Foreign Application Priority Data

Jul. 21, 2015 (IN) .......................... 3754/CHE/2015

(51) Int. Cl.
| | |
|---|---|
| H05B 41/285 | (2006.01) |
| H05B 37/03 | (2006.01) |
| F21S 9/02 | (2006.01) |
| H05B 37/02 | (2006.01) |
| H02J 9/06 | (2006.01) |

(52) U.S. Cl.
CPC ........... H05B 37/0227 (2013.01); H02J 9/061 (2013.01); H05B 37/03 (2013.01)

(58) Field of Classification Search
None
See application file for complete search history.

(56) References Cited

U.S. PATENT DOCUMENTS

| 8,770,771 B2* | 7/2014 | Preta ................... B60Q 1/0023 340/438 |
| 2010/0039794 A1 | 2/2010 | Ghanem et al. |
| 2012/0139422 A1* | 6/2012 | Ren ................... H05B 33/0815 315/126 |

FOREIGN PATENT DOCUMENTS

| EP | 2 148 554 | 1/2010 |
| WO | WO 88/01467 | 2/1988 |

* cited by examiner

*Primary Examiner* — Dedei K Hammond
(74) *Attorney, Agent, or Firm* — Finnegan, Henderson, Farabow, Garrett & Dunner, LLP

(57) ABSTRACT

A method to provide emergency lighting, the method comprising: detecting absence of current in the emergency lighting system; determining state of a main power switch connecting the emergency lighting system with a main power supply; and switching to backup power to provide emergency lighting based on the determination of the state of the main power switch. A system, the system comprising: a signal generator to generate a control signal; a switching unit to connect and disconnect a light emitting element; a control signal sensor to detect the control signal in the emergency lighting system; and a switching controller linked to the switching unit to: detect absence of current in the emergency lighting system; determine state of a main power switch not tied to the emergency lighting system; and switch to backup-up power to provide the emergency lighting based on the determination of the state of the main power switch.

12 Claims, 4 Drawing Sheets

EMERGENCY LIGHTING SYSTEM WITH SMART SWITCHING

PRIORITY CLAIM

This U.S. patent application claims priority under 35 U.S.C. §119 to Indian Application No. 3754/CHE/2015, filed Jul. 21, 2015. The aforementioned applications are incorporated herein by reference in their entirety.

TECHNICAL FIELD

This disclosure relates generally to emergency lighting systems, and more particularly to an emergency lightening system with smart switching.

BACKGROUND

Typically, an emergency lighting system may comprise of an internal backup power. The emergency lighting system may switch to the internal backup power on failure of a main power supply. A user may switch the main power supply off to shut down the emergency lighting system. The emergency lighting system may switch to the internal backup power, if the user switches the main power supply off. Typically, the emergency lighting system may not be able to distinguish between failure of the main power supply and user switching off the main power supply.

SUMMARY

A method to provide emergency lighting, the method comprising: detecting absence of current in the emergency lighting system; determining state of a main power switch connecting the emergency lighting system with a main power supply; and switching to backup power to provide emergency lighting based on the determination of the state of the main power switch.

An emergency lighting system, the system comprising: a signal generator to generate a control signal; a switching unit to connect and disconnect a light emitting element; a control signal sensor to detect the control signal in the emergency lighting system; and a switching controller linked to the switching unit to: detect absence of current in the emergency lighting system; determine state of a main power switch not tied to the emergency lighting system; and switch to backup power to provide the emergency lighting based on the determination of the state of the main power switch.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
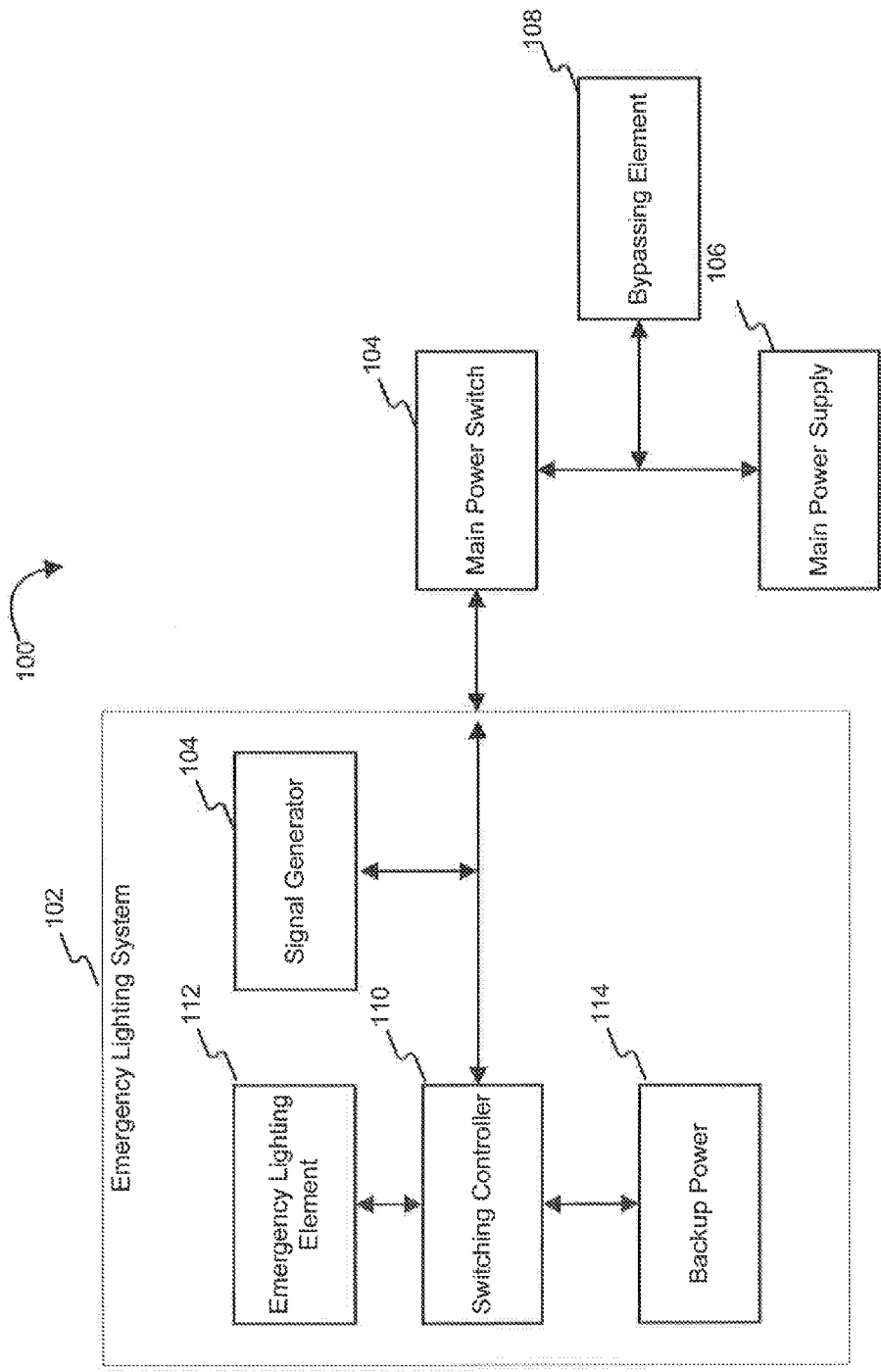
FIG. 1 illustrates an exemplary diagram for an environment with emergency lighting system to provide emergency lighting.

FIG. 1 illustrates an exemplary diagram for an environment 100 with an emergency lighting system 102 to provide emergency lighting. The exemplary environment 100 may include an emergency lighting system 102, a main power switch 104, a main power supply 106 and a bypassing element 108. The emergency lighting system 102 may further contain a switching controller 110, an emergency lighting element 112, a backup power 114 and a signal generator 116. The main power supply 106 may supply power to the emergency lighting system 102. The main power supply 106 may either be direct AC main or some other form of power, such as DC, etc. The main power switch 104 may control the input of the main power supply 106 to the emergency lighting system 102. The main power switch 104 may be controlled by a user. The bypassing element may be connected in parallel to the main power supply 106 between the main power switch 104 and the main power supply 106. The bypassing element may have high resistance or reactance for the main power supply 106, but allows the control signal to pass through. The emergency lighting element 112 may emit light by consuming electric current such as one or more incandescent bulbs or one or more clusters of high-intensity light-emitting diodes (LED). The backup power 114 may provide power to the emergency lighting system 102 on the failure of the main power supply 106 such as deep cycle batteries and other technologies such as flywheel energy storage or fuel cells. The signal generator 116 may be generate a control signal with a frequency that doesn't cause interference with the frequency of the main power supply. The switching controller 110 may alternate power supplied to the emergency lighting element 112 between the main power supply and the backup power 114. While not shown, the exemplary environment 100 may include additional components, which are well known to those of ordinary skill in the art and thus will not be described here.

Figure 2:
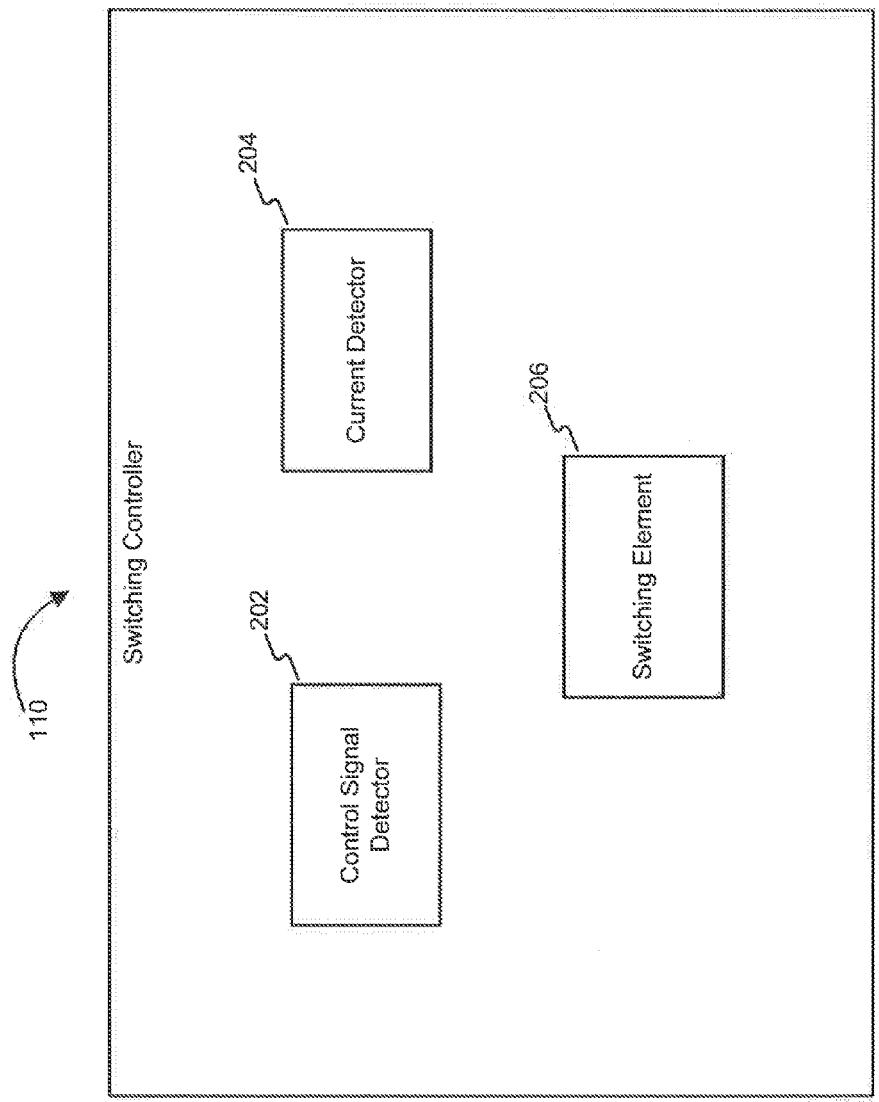
FIG. 2 illustrates the switching controller which may include a control signal detector, a current detector and a switching element.

FIG. 2 illustrates the switching controller 110 which may include a control signal detector 202, a current detector 204 and a switching element 206. The switching controller 110 may detect an absence of electric current in the emergency lighting system. During course of operation, the emergency lighting system 102 may draw electric current from a main power supply. The input of main power supply 106 may be controlled the main power supply switch 104. The main power supply switch 104 may be controlled by a user. During the course of operation of the emergency lighting system 102 the switching controller 110 may detect an absence of electric current in the emergency lighting system 102. The absence of the electric current may be due to the user switching the main power switch 104 off or the main power supply failure. The absence of the electric current of electric current may be detected by the current detector 204. The current detector 204 may be one or more current sensors such as hall-effect sensors, current shunt sensors, current transformer sensors. The one or more current sensors may be well known to those of ordinary skill in the art and thus will not be described here.

Then the switching controller 110 of the emergency lighting system 102 may determine state of the main power switch 104 connecting input of the main power supply 106 to the emergency power system 102. The determination of the state of the main power switch 104 comprises detecting by the switching controller 110, a control signal in the emergency lighting system 102. The control signal may be generated by the signal generator 116 of the emergency lighting system 102. The control signal may pass through the bypassing element 108 connect parallel to the main power supply 106 between the main power switch 104 and the main power supply 106. The bypassing element 108 may have high resistance or reactance for the main power supply 106, but allows the control signal to pass through. Once the control signal passed through the bypassing element 108, the control signal may be detected by the control signal detector 202. If the control signal is detected by control signal detector 202, the state of the main power supply switch 104 may be determined as ON. If the control signal is not detected by the control signal detector 202, the state of the main power supply switch 104 may be determined as OFF. The control signal detector 202 may not detect the control signal, if the control signal doesn't pass through the bypassing element 108. Hence, the state of the main power supply switch 104 may be determined as OFF.

Once the state of the main power supply switch 104 is determined, the switching controller 110 may switch to a backup power 114 to provide emergency lighting. If the state of the main power supply switch 104 is determined as ON, then the switching element 206 may switch to the backup power 114 to provide the emergency lighting. If the state of the main power supply switch 104 is determined as OFF, the switching controller 110 may not switch to the backup power 114. The switching element 206 may be logic gates or multiplexers (MUX) made by using power transistor(s) or made by using relay(s).

Figure 3:
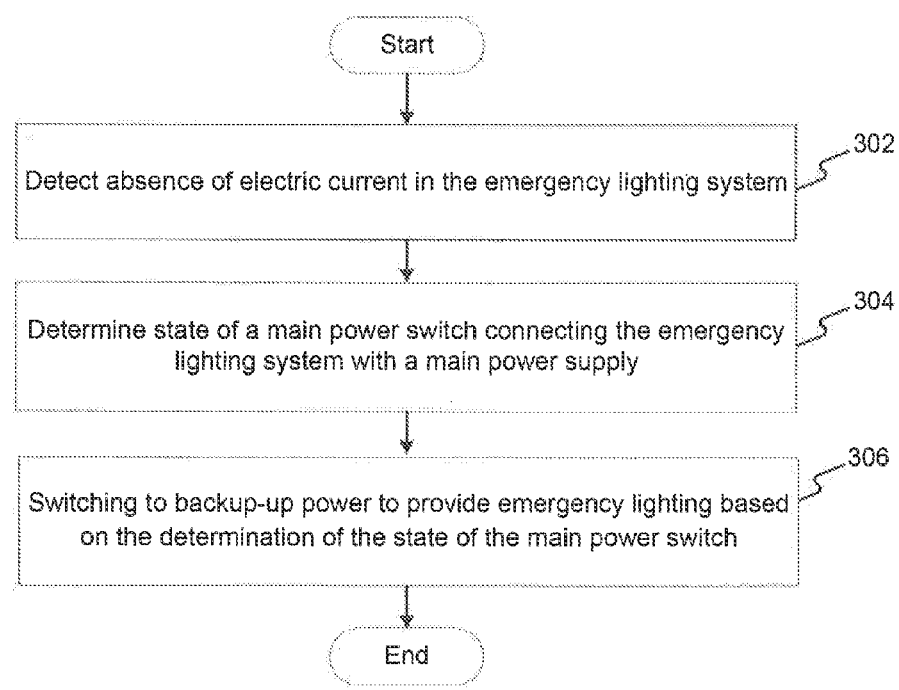
FIG. 3 illustrates an exemplary flow diagram of a method to provide emergency lighting.

FIG. 3 illustrates an exemplary flow diagram of a method to provide emergency lighting. The method may involve detecting, by the switching controller 110 of an emergency lighting system 102, an absence of electric current in the emergency lighting system 102 at step 302. During course of operation, the emergency lighting system 102 may draw electric current from a main power supply. The input of main power supply 106 may be controlled the main power supply switch 104. The main power supply switch 104 may be controlled by a user. During the course of operation of the emergency lighting system 102 the switching controller 110 may detect an absence of electric current in the emergency lighting system 102. The absence of the electric current may be due to the user switching the main power switch 104 off or the main power supply failure. The absence of the electric current of electric current may be detected by the current detector 204. The current detector 204 may be one or more current sensors such as hall effect sensors, current shunt sensors, current transformer sensors. The one or more current sensors may be well known to those of ordinary skill in the art and thus will not be described here.

At step 304, the switching controller 110 of the emergency lighting system 102 may determine state of the main power switch 104 connecting the main power supply 106 to the emergency power system 102. The determination of the state of the main power switch 104 comprises detecting by the switching controller 110, a control signal in the emergency lighting system 102. The control signal may be generated by the signal generator 116 of the emergency lighting system 102. The control signal may pass through the bypassing element 108 connect parallel to the main power supply 106 between the main power switch 104 and the main power supply 106. The bypassing element 108 may have high resistance or reactance for the main power supply 106, but allows the control signal to pass through. Once the control signal passed through the bypassing element 108, the control signal may be detected by the control signal detector 202. If the control signal is detected by control signal detector 202, the state of the main power supply switch 104 may be determined as ON. If the control signal is not detected by the control signal detector 202, the state of the main power supply switch 104 may be determined as OFF. The control signal detector 202 may not detect the control signal, if the control signal doesn't pass through the bypassing element 108. Hence, the state of the main power supply switch 104 may be determined as OFF.

Once the state of the main power supply switch 104 is determined, the switching controller 110 may switch to a backup power 114 to provide emergency lighting at step 304. If the state of the main power supply switch 104 is determined as ON, then the switching element 206 may switch to the backup power 114 to provide the emergency lighting. If the state of the main power supply switch 104 is determined as OFF, the switching controller 110 may not switch to the backup power 114. The switching element 206 may be logic gates or multiplexers (MUX) made by using power transistor(s) or made by using relay(s).

Figure 4:
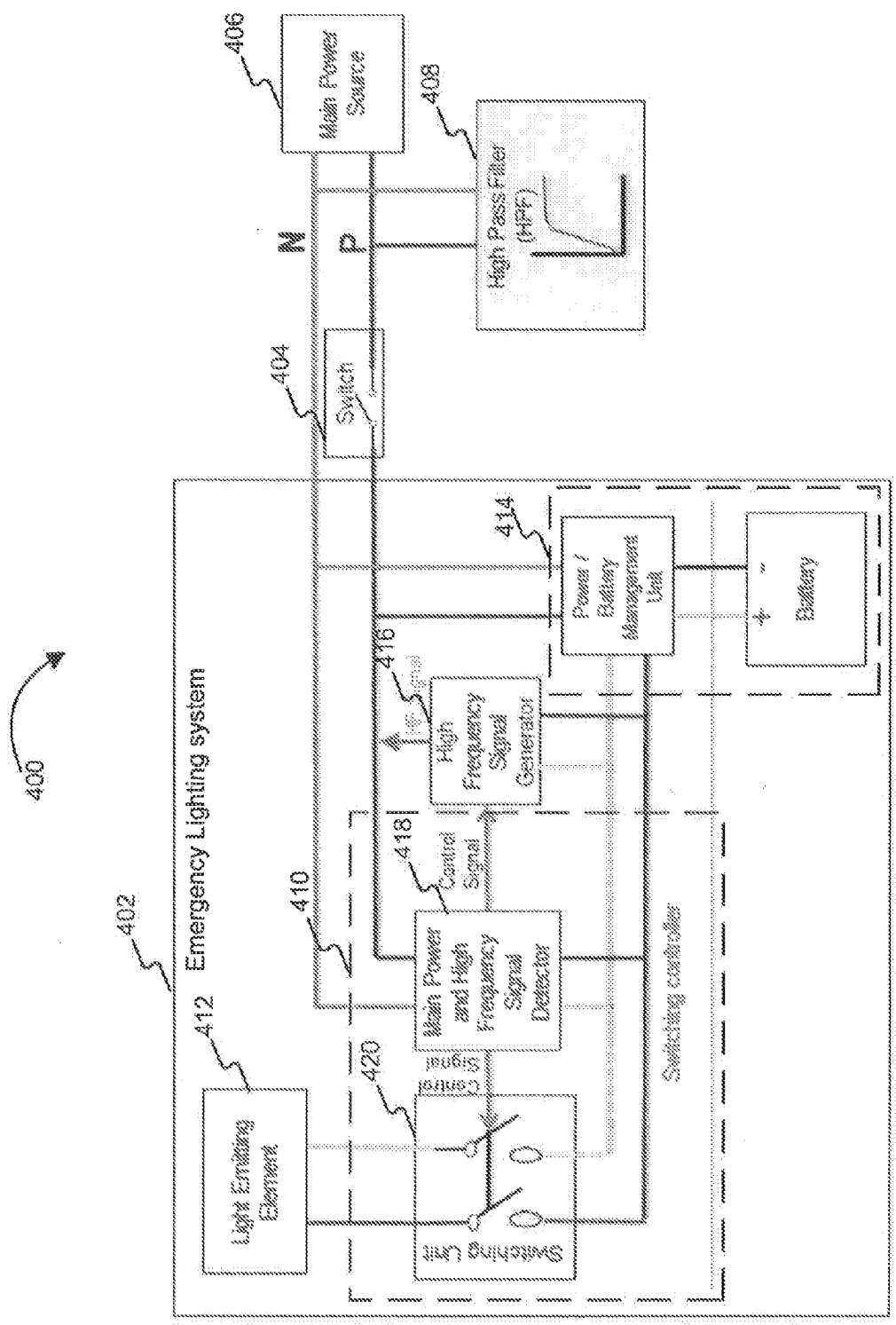
FIG. 4 illustrates an exemplary circuit diagram 400 with an emergency lighting system to provide emergency lighting.

FIG. 4 illustrates an exemplary circuit diagram 400 with an emergency lighting system to provide emergency lighting. The exemplary circuit diagram 400 may include an emergency lighting system 402, a switch 404 (as the main power switch 104), a main power source 406 (as the main power supply 106) and a High Pass Filter 408 (as the bypassing element 108). The emergency lighting system 402 may further contain a switching controller 410, a light emitting element 412 (as the emergency lighting element 112), a battery management unit and a battery 414 (as the backup power 114) and a high frequency signal generator 416 (as the signal generator 116). The switching controller 410 may include a main power and high frequency signal detector 418 (as the control signal detector 202 and current detector 204), and a switching unit 420. The switching controller 410 may detect an absence of electric current in the emergency lighting system. During course of operation, the emergency lighting system 402 may draw electric current from the main power source 406. The input of main power source 406 may be controlled the switch 404. The switch 404 may be controlled by a user. During the course of operation of the emergency lighting system 402 the switching controller 410 may detect an absence of electric current in the emergency lighting system 402. The absence of the electric current may be due to the user switching the switch 404 off or the main power source 406 failure. The absence of the electric current of electric current may be detected by the main power and high frequency signal detector 418. The main power and high frequency signal detector 418 may be one or more current sensors such as hall-effect sensors, current shunt sensors, current transformer sensors. The one or more current sensors may be well known to those of ordinary skill in the art and thus will not be described here.

Then the switching controller 410 of the emergency lighting system 102 may determine state of the switch 404 connecting input of the main power source 406 to the emergency power system 402. The determination of the state of the switch 404 comprises detecting by the switching controller 410, a high frequency control signal in the emergency lighting system 402. The control signal may be generated by the signal generator 416 of the emergency lighting system 402. The control signal may pass through the high pass filter 408 connect parallel to the main power source 406 between the switch 404 and the main power source 406. The high pass filter 408 may have high resistance or reactance for the supply from the main power source 406 resistance as compared to the emergency lighting system 102, but allows the high frequency control signal to pass through. Once the high frequency control signal passed through the high pass filter 408, the high frequency control signal may be detected by the main power and high frequency signal detector 418. If the high frequency control signal is detected by the main power and high frequency signal detector 418, the state of the switch 404 may be determined as ON. If the high control signal is not detected by the main power and high frequency signal detector 418, the state of the switch 404 may be determined as OFF. The main power and high frequency signal detector 418 may not detect the high frequency control signal, if the control signal doesn't pass through the high pass filter 408. Hence, the state of the switch 404 may be determined as OFF.

Once the state of the switch 404 is determined, the switching controller 110 may switch to a backup power 414 to provide emergency lighting. If the state of the switch 404 is determined as ON, then the switching unit 420 may switch to the backup power 414 to provide the emergency lighting. If the state of the switch 404 is determined as OFF, the switching unit 420 may not switch to the backup power 414. The switching unit 420 may be logic gates or multiplexers (MUX) made by using power transistor(s) or made by using relay(s).

It is intended that the disclosure and examples be considered as exemplary only, with a true scope and spirit of disclosed embodiments being indicated by the following claims.

The invention claimed is:

1. A method to provide emergency lighting, the method comprising: detecting, by a switching controller of an emergency lighting system, absence of electric current in the emergency lighting system; determining, by the switching controller, a state of a main power switch connecting the emergency lighting system with a main power supply, the determining comprises: transmitting a control signal associated with the absence of the electric current to the main power supply through the main power switch; determining the state of the main power switch to be ON as long as the control signal is, received from the main power supply: determining the state of the main power switch to be OFF if the control signal is not received from the main power supply; and switching, by the switching controller, to backup-up power to provide emergency lighting based on the determination of the state of the main power switch.

2. The method of claim 1, wherein the control signal is generated by a source external to the switching controller.

3. The method of claim 2, wherein the control signal passes through a bypassing element connected in parallel to a main power supply.

4. The method of claim 3, wherein the bypassing element has high resistance or reactance for the main power supply, but allows the control signal to pass through.

5. The method of claim 1, wherein the main power switch is controlled by a user to control the emergency lighting system.

6. The method of claim 1, wherein the control signal is generated by the switching controller.

7. An emergency lighting system, the system comprising: a signal generator to generate a control signal; a bypassing element to pass the control signal in the emergency lighting system; and a switching controller configured to: detect absence of electric current in the emergency lighting system; determine a state of a main power switch connecting the emergency lighting system with a main power supply, the determining comprises: transmitting a control signal associated with the absence of the electric current to main power supply through the main power switch; determining the state of the main power switch to be ON as long as the control signal is received from the main power supply; determining the state of the main power switch to be OFF if the control signal is not received from the main power supply; and switch to backup power to provide the emergency lighting based on the determination of the state of the main power switch.

8. The emergency lighting system of claim 7, wherein the control signal is generated by a source external to the switching controller.

9. The emergency lighting system of claim 8, wherein the control signal passes through a bypassing element connected in parallel to a main power supply.

10. The emergency lighting system of claim 9, wherein the bypassing element has high resistance or reactance for the main power supply, but allows the control signal to pass through.

11. The emergency lighting system of claim 7, wherein the main power switch is controlled by a user to control the emergency lighting system.

12. The emergency lighting system of claim 7, wherein the control signal is generated by the switching controller.

* * * * *